United States Patent Office

3,836,481
Patented Sept. 17, 1974

3,836,481
CATALYST COMPOSITION OF ETHYLENE TO
ETHYLENE OXIDE
Tsunesuke Kajimoto and Shigeru Wakamatsu, Kamakura, Japan, assignors to Toray Industries, Inc., Tokyo, Japan
No Drawing. Filed June 1, 1972, Ser. No. 258,522
Claims priority, application Japan, June 11, 1971, 46/41,042, 46/41,043; June 15, 1971, 46/42,206; June 16, 1971, 46/42,568; June 18, 1971, 46/43,279
Int. Cl. B01j 11/08
U.S. Cl. 252—462                                      7 Claims

ABSTRACT OF THE DISCLOSURE

The silver catalyst compositions containing, as a promoter, at least one metal selected from the group consisting of lanthanum, praseodymium, neodymium, terbium and dysprosium give a high selectivity in the oxidation reaction of ethylene to ethylene oxide.

---

This invention relates to a catalyst composition for oxidation of ethylene to ethylene oxide. More particularly it relates to a silver catalyst containing a specified promoter.

Ethylene oxide has been produced by contacting ethylene and molecular oxygen with a silver catalyst at an elevated temperature. In this oxidation reaction, it is important to control undesired side reactions, especially oxidation of ethylene to carbon dioxide and water, which competitively occurs with the oxidation to ethylene oxide. The silver catalyst for oxidation of ethylene has therefore been required to give a high selectivity to ethylene oxide in addition to a high catalytic activity and a long catalytic life. In order to improve the selectivity of silver catalyst for oxidation of ethylene, various kinds of promoter such as sulfur iodine, chlorine and lead compounds have been proposed.

Some of these silver catalysts have been used for the industrial production of ethylene oxide. However the selectivities of these catalysts are not necessarily satisfactory, and further improvement in the selectivity has been desired.

We have found that the selectivity of silver catalyst for the oxidation of ethylene to ethylene oxide can be highly improved by adding, as a promoter, one or more selected metals of lanthanide series.

The present invention is a catalyst composition for the oxidation of ethylene to ethylene oxide which comprises a silver catalyst and, as a promoter, at least one metal selected from the group consisting of lanthaum, praseodymium, neodymium, terbium and dysprosium.

The silver catalyst, which is a main component of the catalyst composition of this invention, may be silver and/or silver oxide which can be prepared from various silver compounds such as reduced silver, silver carbonate, silver lactate and so on.

The selected metals of lanthanide series, which are used as the other essential component of the catalyst composition of this invention, can be added to a silver catalyst in a form of elemental metal or compounds thereof. The compounds may be oxides, chlorides, bromides, iodides, hydroxides, sulfates, carbonates, nitrates, oxychlorides, oxalates, lactates, acetates, acetyl acetonates, phenolates of the lanthanide series metals.

The promoter is added to a silver catalyst component by treating a silver catalyst with a solution or slurry containing selected metals of the lanthanide series.

The catalyst composition of this invention can be used without carrier, but from the practical point of view the catalyst composition is preferably supported on a carrier. In this case the selected metal of the lanthanide series may be added by treating a supported silver catalyst composition with a solution or a slurry containing lanthanide metals. It is also possible to support both silver catalyst component and selected lanthanide metal component at the same time.

The catalyst compositions of this invention can be prepared in accordance with conventional methods, some of which can be exemplified as follows.

In a first method, a carrier is impregnated with an aqueous solution containing a silver salt and lanthanide metal salts and then heated to drying. In another method a carrier is added to a slurry containing silver oxide and lanthanide metal salts and then the mixture is heated to be dried and activated.

In third method, the reduced silver is immersed in aqueous solution of a lanthanide metal salt and then the lanthanide metal is forced to precipitate on the surface of the silver catalyst by conversion to an insoluble salt. The silver coated with lanthanide metal salts thus obtained can be supported on a suitable carrier by a conventional method.

The supported catalyst composition thus obtained may be activated by heating at an elevated temperature or contacting a gas containing oxygen, hydrogen, ethylene, helium, nitrogen or small amount of chlorine or chlorine containing compound.

Examples of a carrier suitable for the catalyst composition of this invention are fused alumina, corundum, silica, silica-alumina, silicon, silicon carbide, fused beryllum, magnesium-aluminum spinel, sintered diatomaceous earth, brick pumice, graphite, silicon iron, silver plate and aluminum powder. The carrier has preferably less than 1 m.$^2$/g. of surface area.

The catalyst composition of this invention contains, as a promoter, the selected metals of lanthanide series in amount of about 0.01 to about 1 atomic percent on the basis of atom of silver.

These lanthanide metals preferably are dispersed in silver catalyst as uniformly as possible.

In the preparation of the catalyst of this invention, well-known moderators such as alkali or alkaline earth metal compound including barium nitrate, barium sulfate barium lactate, calcium carbonate, calcium lactate and lithium hydroxide may be used.

Conventional catalytic operation can be applied to the oxidation of ethylene to ethylene oxide using a catalyst composition of this invention. The reaction temperature is 190 to 350° C. preferably 200 to 280° C. The optimum reaction temperature is variable according to the activity of the catalyst composition.

The reaction can be carried out at atmospheric pressure or an elevated pressure.

Ethylene is mixed with a gas containing molecular oxygen and fed to the reaction zone containing a catalyst composition. As the gas containing molecular oxygen, the air can be preferably used. The feed gas contains 3 to 20 vol. percent preferably 4 to 10 vol. percent of oxygen and 3 to 30 vol. percent preferably 3 to 6 vol. percent of ethylene. The feed gas may also contain a small amount of halogen compounds such as dichloroethane, dibromoethane and diphenyl chloride, tetra ethyl lead, benzene, ethanol, ozone and hydrogen peroxide.

The following examples are introduced for the purpose of illustration of the present invention with no intention to limit the scope of the same.

The terms selectivity and conversion used in the example means as represented by following formulae, Selectivity (percent)

$$= \frac{\text{mol of ethylene oxide produced}}{\text{mol of ethylene reacted}} \times 100$$

Conversion (percent) $= \dfrac{\text{mol of ethylene reacted}}{\text{mol of ethylene fed}} \times 100$

EXAMPLE 1

In 800 parts of water 170 parts of silver nitrate was dissolved and then 120 parts of 40% aqueous solution of sodium hydroxide was added with stirring to give the precipitate of dark brown silver oxide, which was collected with filtration, washed with distilled water and dried at reduced pressure.

In 160 parts of water 12.7 parts of sodium bicarbonate was dissolved and 23 parts of silver oxide was added. Nine parts of 37% of folmalin was diluted with 100 parts of water and the solution was added dropwise in 30 minutes to the above sodium bicarbonate solution with constant stirring. During the reaction the temperature of the solution was kept at 5 to 10° C. by immersing the reaction flask in the cold water bath. After the addition of the folmalin solution was over, the precipitate of reduced silver was filtered, washed with distilled water and dried at reduced pressure.

By the following procedure lanthanum hydroxide was coated on the reduced silver.

In 1000 parts of water 0.123 parts of lanthanum chloride was dissolved and 108 parts of reduced silver was added. To this mixture 120 parts of 0.5% aqueous solution of sodium hydroxide was added with stirring and kept stirring for 5 minutes, then the silver powder was filtered, washed with distilled water and dried at reduced pressure. The molar percentage of lanthanum hydroxide in respect to silver was considered to be 0.05%.

In 300 parts of water 10.5 parts of barium nitrate was dissolved at 90° C. and to this solution 108 parts of silver powder coated with lanthanum hydroxide was added and mixed well. Four hundred parts of the catalyst support particles (⅛ inch x ⅛ inch pellet, Alundum, SA5103, Norton Co.) was added to the above suspension and dried at 105 to 110° C. with stirring to give a catalyst.

The catalyst was placed in a ½ inch diameter U-shaped glass reactor which was immersed in an oil bath. The temperature of the catalyst bed was controlled at 240° C. To this reactor a gaseous mixture of 95% air and 5% ethylene was passed at a space velocity of 1200 hr.$^{-1}$. The analysis of the effluent gas after 195 hours showed the conversion was 28% and the selectivity was 73% as shown in table 1.

By way of comparison another catalyst was prepared by the same procedure as shown above except for using the reduced silver without performance of lanthanum hydroxide coating. The oxidation of ethylene was done with the use of this catalyst. The analysis of the effluent gas after 195 hours reaction showed the conversion was 26% and the selectivity was 61%.

EXAMPLES 2-5

Reduced silver was prepared by the same method as described in example 1. In place of lanthanum chloride, praseodymium, terbium, neodymium or dysprosium chloride was dissolved and each metal hydroxide was coated on the reduced silver by the same method. The molar percentage of each rare-earth metal hydroxide in respect to silver was adjusted to be 0.05%. Catalysts were then prepared using each coated silver respectively.

The results of the oxidation of ethylene with the use of these catalysts were shown in table 1.

TABLE 1.—THE OXIDATION OF ETHYLENE WITH SILVER CATALYSTS COATED WITH RARE-EARTH METAL HYDROXIDES

| Example number | Rare-earth metal | Reaction Temp. (° C.) | Time (hr.) | Conversion (percent) | Selectivity (percent) |
|---|---|---|---|---|---|
| 1 | La | 240 | 195 | 27 | 65 |
|   | (1) | 240 | 195 | 26 | 61 |
| 2 | Pr | 240 | 195 | 23 | 73 |
| 3 | Tb | 240 | 195 | 21 | 74 |
| 4 | Nd | 240 | 195 | 28 | 73 |
| 5 | Dy | 240 | 195 | 21 | 74 |

¹ Silver catalyst without rare-earth metal hydroxide coating.

EXAMPLE 6

In 1000 parts of water were dissolved 109 parts of calcium lactate and 4 parts of lanthanum lactate. To this solution 372 parts of silver oxide was added and mixed well. To this suspension 1933 parts of the catalyst support particles (⅛ inch x ⅛ inch pellet, Mulnorite; BK 219, Norton Co.) was added and dried at 100 to 110° C. with stirring for 5 hours and afterward heated up to 350° C. and kept at this temperature for 3 hours to give a catalyst, which contained 0.3 molar percentage of lanthanum lactate in respect to silver.

The catalyst was placed in a ½ inch diameter U-shaped stainless-steel reactor which was immersed in an oil bath, the temperature of the catalyst bed was controlled at 220° C. To this reactor a gaseous mixture of 95% air and 5% ethylene was passed at a space velocity of 1200 hr.$^{-1}$. The analysis of the effluent gas after 235 hours reaction showed the conversion was 31% and the selectively was 66%.

A catalyst for comparison was prepared by the same procedure described above except that no lanthanum lactate was added. The conversion and the selectivity of the reaction gas with this catalyst after 211 hours were 29% and 62% respectively.

EXAMPLES 7-10

In place of lanthanum lactate, four other catalysts were prepared with praseodymium, terbium, neodymium and dysprosium lactates by the same method as example 6. The molar percentage of each rare-earth metal lactate in respect to silver was adjusted to 0.2%.

The results of oxidation of ethylene with the use of these catalysts were shown in table 2.

TABLE 2.—THE OXIDATION OF ETHYLENE WITH SILVER CATALYST PREPARED USING RARE-EARTH METAL LACTATES

| Example number | Rare-earth metal | Reaction Temp. (° C.) | Time (hr.) | Conversion (percent) | Selectivity (percent) |
|---|---|---|---|---|---|
| 6 | La | 220 | 235 | 31 | 66 |
|   | (1) | 220 | 211 | 29 | 62 |
| 7 | Pr | 220 | 235 | 27 | 69 |
| 8 | Tb | 220 | 235 | 25 | 72 |
| 9 | Nd | 220 | 235 | 31 | 69 |
| 10 | Dy | 220 | 235 | 24 | 72 |
| 11 | La | 240 | 235 | 28 | 66 |
|   | (1) | 240 | 234 | 26 | 62 |
| 12 | Pr | 240 | 235 | 24 | 73 |
| 13 | Tb | 240 | 235 | 22 | 74 |
| 14 | Nd | 240 | 235 | 27 | 73 |
| 15 | Dy | 240 | 235 | 22 | 74 |

¹ Silver catalyst without rare-earth metal lactate.

EXAMPLE 11

A thousand parts of silver oxide was added to 1200 parts of 90% aqueous solution of lactic acid with stirring over a period of about 30 minutes at 85 to 95° C. To this mixture 50 parts of 30% aqueous solution of hydrogen peroxide was slowly added, and then 272 parts of barium lactate and 7 parts of lanthanum lactate were added.

A thousand parts of catalyst particles (³⁄₁₆ inch sphere, Alundum; SA5103, Norton Co.) was immersed in the above obtained solution which was heated at 90 to 95° C. After 15 minutes occasional stirring, the impregnated support particles were filtered and then dried for 12 hours at 65° C. in the oven. Afterward the dried impregnated particles were heated gradually over a period of 4 hours to 250° C. and maintained at this temperature for 5 hours. Thus obtained catalyst contained 11.5 wt. percent of silver. The molar percentages of barium lactate and lanthanum lactate in respect to silver were 10% and 0.2% respectively.

The oxidation of ethylene with this catalyst was carried out in a ½ inch diameter cylindrical stainless-steel reactor. A gaseous mixture containing 5% ethylene, 5% carbon dioxide and the balance air was passed over this catalyst at a space velocity of 1200 hr.$^{-1}$. The temperature of the catalyst bed was kept at 240° C.

The analysis of the effluent gas after 235 hours showed that the conversion of the reaction was 28% and the selectivity was 66% as shown in table 2.

By way of comparison, a catalyst was prepared as above except that it contained no lanthanum lactate.

The results were also shown in table 2.

EXAMPLES 12–15

In place of lanthanum lactate, four other catalysts were prepared with praseodymium, terbium, neodymium and dysprosium lactates by the same method as example 11.

The molar percentage of each rare-earth metal lactate in respect to silver was adjusted to 0.2%.

The results of oxidation of ethylene with the use of these catalysts were shown in table 2.

We claim:

1. A catalyst composition for the oxidation of ethylene to ethylene oxide which comprises a reduced silver and at least one rare earth metal selected from the group consisting of lanthanum, praseodymium, neodymium, terbium and dysprosium supported on a carrier having less than 1 m.$^2$/g. of surface area, said catalyst composition being prepared by a method which includes the steps of:

(1)

(a) immersing a reduced silver into an aqueous solution of a soluble salt of at least one rare earth metal selected from the group consisting of lanthanum, praseodymium, neodymium, terbium and dysprosium;

(b) adding an aqueous solution selected from the group consisting of the alkali metal hydroxides and the alkaline earth metal hydroxides, thereby converting said soluble salt of said rare earth metal into insoluble hydroxide which precipitates on the reduced silver;

(c) filtering off the reduced silver and the precipitated rare earth metal hydroxide; and (d) washing them with water, and (2)

(a) preparing a slurried solution containing the reduced silver thus combined with rare earth metal salt;

(b) coating a carrier having a surface area of less than 1 m.$^2$/g. with the slurried solution; and (c) drying the coated carrier.

2. The catalyst composition as claimed in Claim 1, wherein the reduced silver for said immersing step is prepared by reduction of silver oxide with formaline in alkaline solution.

3. The catalyst composition as claimed in Claim 1, wherein the soluble salt of the rare earth metal for said immersing step is a chloride.

4. The catalyst composition as claimed in Claim 1, wherein the alkali metal hydroxide in said adding step is sodium hydroxide.

5. The catalyst composition as claimed in Claim 1, wherein the slurried solution in said preparing step further contains a salt of alkaline earth metal.

6. The catalyst composition as claimed in Claim 5, wherein the salt of alkaline earth metal in said adding step is barium nitrate.

7. The catalyst composition as claimed in Claim 1, wherein the slurried solution in said preparing step is aqueous.

References Cited

UNITED STATES PATENTS

| | | | |
|---|---|---|---|
| 2,337,421 | 12/1943 | Spence et al. | 252—462 |
| 2,615,899 | 10/1952 | Sears | 260—348.5 R |
| 2,615,900 | 10/1952 | Sears | 260—348.5 R |
| 3,121,099 | 2/1964 | Endler | 260—348.5 R |
| 3,205,280 | 7/1965 | Wattimena et al. | 260—462 |
| 3,461,140 | 8/1969 | Titzenthaler | 260—348.5 R |
| 3,488,962 | 1/1970 | McCormick | 260—462 |

OTHER REFERENCES

Bijvoet et al.: Solid State Communications 4, 1966, p. 455–8.

DANIEL E. WYMAN, Primary Examiner

A. P. DEMERS, Assistant Examiner

U.S. Cl. X.R.

252—447, 455 R, 457, 475, 476; 260—348.5 R